(No Model.)
C. E. KENDALL.
RAILWAY CAR BRAKE.
No. 256,485. Patented Apr. 18, 1882.
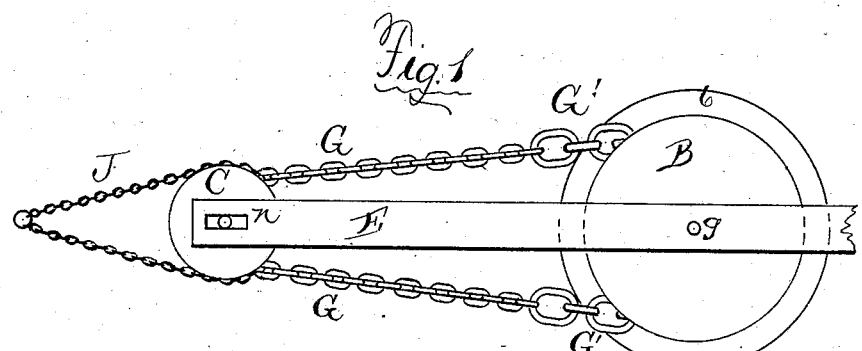
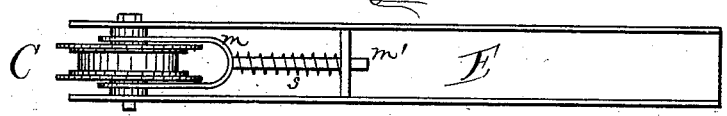
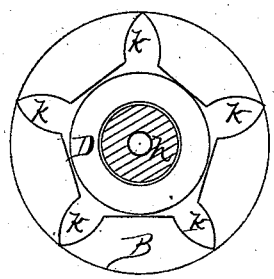
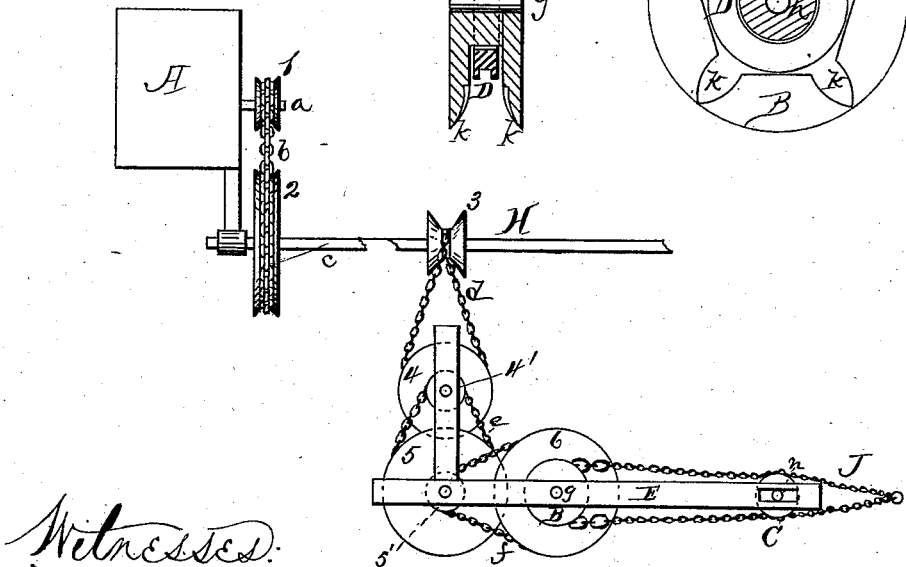
Witnesses:
T. H. Parsons
J. R. Drake
C. E. Kendall,
Inventor, by
J. R. Drake, Atty
N. PETERS. Photo-Lithographer, Washington, D. C.

UNITED STATES PATENT OFFICE.

CHAUNCEY E. KENDALL, OF BUFFALO, NEW YORK.

RAILWAY-CAR BRAKE.

SPECIFICATION forming part of Letters Patent No. 256,485, dated April 18, 1882.

Application filed March 2, 1882. (No model.)

*To all whom it may concern:*

Be it known that I, CHAUNCEY E. KENDALL, a citizen of the United States, residing at Buffalo, county of Erie, and State of New York, have made certain Improvements in Steam-Railway Brakes, of which the following is a specification.

This invention consists mainly in the employment of a series of endless chains and pulleys transmitting power from a motor to the brake-shaft and thence to the brakes, all fully hereinafter explained.

In the drawings, Figure 1 is a plan view of an endless chain with different-sized links running over pulleys which operate the brake-chain and brake; Fig. 2, a side elevation of the frame in which runs the chain-tightening pulley in a spring-saddle; Fig. 4, one-half of the large chain-pulley, showing beveled sides, one side of said pulley removed; Fig. 3, a vertical section through same pulley. Fig. 5 is a plan of the main working parts of the device.

In Fig. 5, A represents the motor, placed under the cab of a locomotive. *a* is the short shaft connected therewith, on which is a small grooved pulley, I, with an endless chain, *b*, thereon, which also runs over a larger grooved pulley, 2, on a shaft, *c*, which shaft is connected by suitable couplings to the continuous angling brake-shaft H, (couplings not shown, as no claim is made to them or the brake-shaft,) which runs under each and all the cars of a train. About under the center of each car, or between the two trucks, I attach to the brake-shaft H a deeply-grooved pulley, 3, with "risers" thereon, in which groove runs an endless chain, *d*, and also over another and larger grooved pulley, 4, running in an arm of frame E, which frame and arm are securely attached to the under side of a car, the pulleys all running horizontally.

Attached to the side of and forming part of pulley 4 is a smaller pulley, 4′, with an endless chain, *e*, running over it and round a large grooved pulley, 5, in frame E, its axle running in the junction of the frame and its arm. On this axle and attached to the pulley 5 is a smaller grooved pulley, 5′, with an endless chain, *f*, running around it and also around a large grooved pulley, 6. This pulley has fastened to its side another and peculiarly-constructed pulley, B, running on the same axle, *g*, in frame E. This pulley B is usually made or cast in two parts, (see Figs. 3 and 4,) one side or half having an enlarged hub or barrel, *h*, on the inside face, around which is set a loose wheel or pulley, D, and which revolves on said hub, for a purpose to be presently explained. The other side or half of pulley B is fastened to the first part, making, in fact, one pulley, with wheel D running in its groove on its hub *h*. The inside of the rims of this pulley B are beveled and formed into risers *k k k*, to better hold the largest links of the endless chain G. This chain is peculiarly constructed, inasmuch as one part of it, which works in the groove of said pulley, is made of larger links, G′, of sufficient size to hold therein, while the remainder of the chain is of smaller links, G, and which are thus constructed so as to set down onto loose wheel D when the large links of chain G have been revolved off of pulley B, thus allowing pulley B to revolve by the continuous movement of the brake-shaft, while the loose wheel D remains stationary, preventing the chain G from further movement and tightening the brakes beyond what is intended. This chain G also runs over a grooved pulley, C, in the end of frame E, said pulley setting in a saddle, *m*, through the ends of which the axle of the pulley goes, and which work also in oblong bearings or slots *n n* in the frame E. (See Figs. 1 and 5.) This saddle has a projecting stem, *m*′, the end running through a guide, *p*, and with a spiral or other spring, *s*, in connection with the stem or saddle, which, with the bearings *n n*, allow the pulley C a play forward and backward in said bearings by the pressure of the spring on the saddle, for the purpose of keeping the chain G at a proper tension. This is a very important feature of the invention, as is also the endless chain G with different-sized links, as this allows the employment of the loose wheel D in pulley B, for when the small links rest on wheel D a slack would occur in the chain were it not for the spring and saddle pressing the pulley C forward, making it act also as a tightening-wheel.

To the chain G and over pulley C is fastened the brake-chain J, one end attached to chain G on one side of the pulley C and the other end on the other side of pulley C to chain G. This chain J is fastened by its connections to the brakes.

The operation of the whole is simple: When the motor is operated from the locomotive it turns pulley 1, and by endless chain $b$ pulley 2 on rod $c$. This, by a series of couplings and angling-rods, (not a part of this invention,) operates the brake-shaft H under each car, which turns the pulley 3, and by endless chains $d\ e\ f$ and pulleys 4, 5, 6, &c., operates the device B and C, with endless chain G G' thereon, and the brake-chain J, connected to brakes.

I claim—

1. In combination with a motor, the grooved pulleys 1 and 2, shafts $a$ and $c$, and endless chain $b$, arranged under the engine, for transmitting movement to brake-shaft H, and the pulleys 3 4 5 6, arranged under a car, with endless chains thereon, for transmitting action from the brake-shaft to pulleys B, D, and C in frame E, and to brakes, all arranged and operating substantially as and for the purpose specified.

2. In combination with any suitable devices for transmitting motion from the angling brake-shaft H to grooved pulley 6, and in combination therewith, the chain wheel or pulley B, moving with pulley 6, having the risers $k\ k$ in its grooves, also the loose wheel D, running on its hub $h$, which forms part of pulley B, also the grooved wheel C on an axle running in the oblong slots $n\ n$ in frame E, said pulley C also running in saddle $m$, with a spring, $s$, in connection therewith, and with the endless chain G, all arranged and operating substantially as and for the purpose specified.

3. In combination with the pulley B, having its loose wheel D, pulley C in spring-saddle $m$ and running in oblong slots $n\ n$, the endless chain G, one section or part composed of large links G' and the remainder of smaller links, as and for the purpose specified.

4. In combination with the frame E, the saddle $m\ m'$, with the grooved pulley C running therein, its axle running in ends of said saddle and also in oblong bearings $n\ n$ in frame E, and the spring $s$, operating in connection with said saddle, chain G G', and pulley B D, all arranged and operating substantially as and for the purpose specified.

In witness whereof I have hereunto signed my name in the presence of two subscribing witnesses.

C. E. KENDALL.

Witnesses:
J. R. DRAKE,
T. H. PARSONS.